(12) United States Patent
Sato et al.

(10) Patent No.: US 7,971,703 B2
(45) Date of Patent: Jul. 5, 2011

(54) CONVEYING APPARATUS AND CONVEYED OBJECT INSPECTION APPARATUS

(75) Inventors: Takemitu Sato, Sagae (JP); Satoshi Hasegawa, Yamagata (JP); Masami Nakajima, Sendai (JP); Yasushi Toyama, Tokyo (JP); Haruo Miyata, Tokyo (JP)

(73) Assignee: Daikyo Seiko, Ltd., Tokyo (JP)

( * ) Notice: Subject to any disclaimer, the term of this patent is extended or adjusted under 35 U.S.C. 154(b) by 228 days.

(21) Appl. No.: 12/302,393

(22) PCT Filed: May 25, 2007

(86) PCT No.: PCT/JP2007/060718
§ 371 (c)(1),
(2), (4) Date: Nov. 25, 2008

(87) PCT Pub. No.: WO2007/139025
PCT Pub. Date: Dec. 6, 2007

(65) Prior Publication Data
US 2009/0139832 A1    Jun. 4, 2009

(30) Foreign Application Priority Data
May 29, 2006   (JP) .................. 2006-148163

(51) Int. Cl.
*B65G 33/06* (2006.01)
(52) U.S. Cl. ..................... 198/625; 198/459.4
(58) Field of Classification Search ............ 198/625, 198/459.3, 459.4
See application file for complete search history.

(56) References Cited

U.S. PATENT DOCUMENTS

| | | | | | |
|---|---|---|---|---|---|
| 2,890,787 | A | * | 6/1959 | Carter | 198/411 |
| 3,004,650 | A | * | 10/1961 | Pettee | 198/382 |
| 3,429,435 | A | * | 2/1969 | Eckhardt | 209/39 |
| 3,547,261 | A | * | 12/1970 | Heinz | 366/85 |
| 3,841,946 | A | * | 10/1974 | Carter | 156/566 |
| 4,438,840 | A | * | 3/1984 | Damen | 198/398 |
| 4,526,128 | A | * | 7/1985 | Sorace et al. | 118/314 |
| 4,690,267 | A | * | 9/1987 | Gradoboev et al. | 198/396 |

FOREIGN PATENT DOCUMENTS

| | | |
|---|---|---|
| JP | 59062430 A | 4/1984 |
| JP | 1307485 A | 12/1989 |
| JP | 10221311 A | 8/1998 |
| JP | 10243908 A | 9/1998 |
| JP | 2000153913 A | 6/2000 |
| JP | 2003098109 A | 4/2003 |

* cited by examiner

*Primary Examiner* — Joe Dillon, Jr.
(74) *Attorney, Agent, or Firm* — The Webb Law Firm

(57) ABSTRACT

A conveying apparatus and a conveyed object inspection apparatus which can perform accurate, damage free image inspection. One conveying roller has a conveying surface formed in a spiral manner on an outer periphery surface thereof. The conveying surface is slanted with respect to the central axis narrowing toward other end side so as to convey a conveyed object while holding it between the conveying surface and other conveying roller. The other conveying roller has a tilt surface provided in a spiral manner on an outer periphery surface thereof. The tilt surface is slanted with respect to the central axis narrowing toward one end side. A feeding means can feed the conveyed object inbetween the conveying rollers. An inspection section has an image acquisition means capable of acquiring an image of an entire outer surface of the conveyed object, and an abnormality detecting means capable of detecting abnormality of the conveyed object based on the image A removing means can then remove an abnormal object.

6 Claims, 4 Drawing Sheets

[Fig. 1]
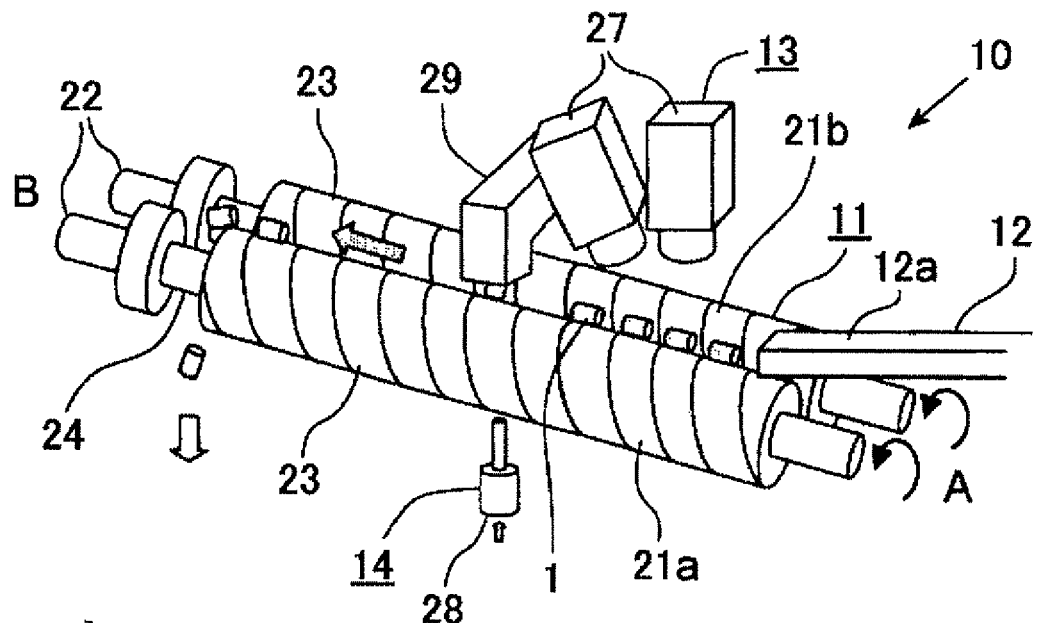
[Fig. 2]
(a) (b)
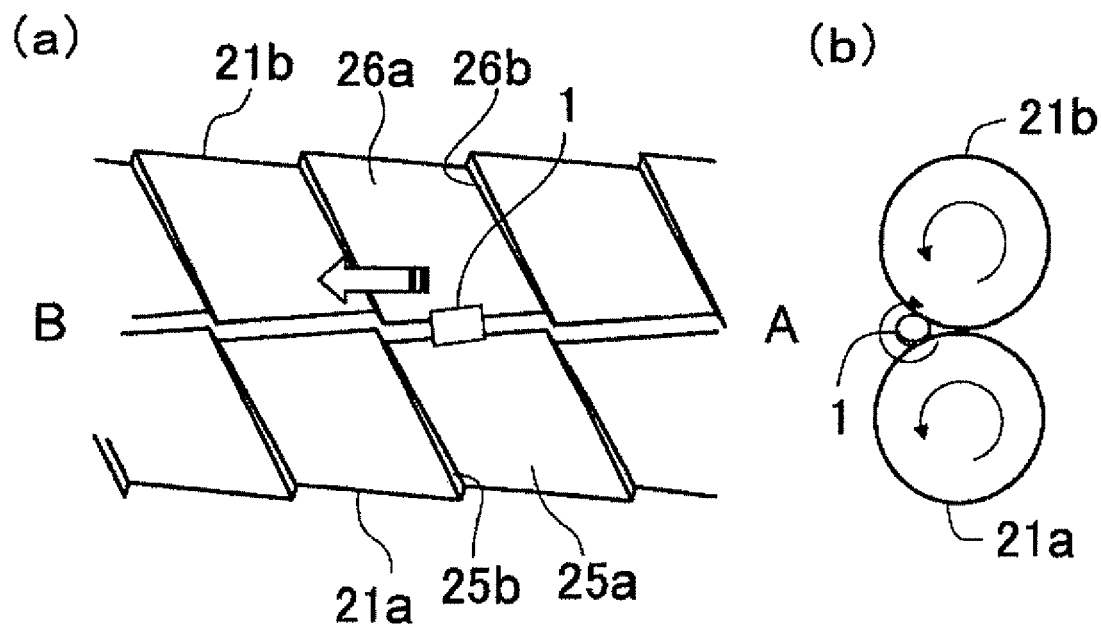

[Fig. 3]
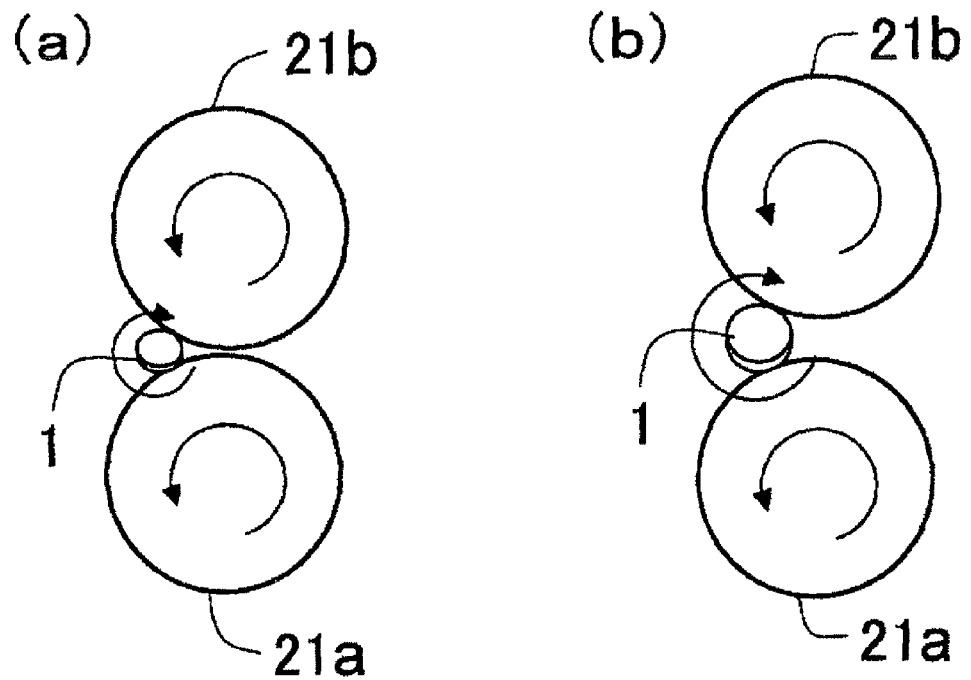
[Fig. 4]
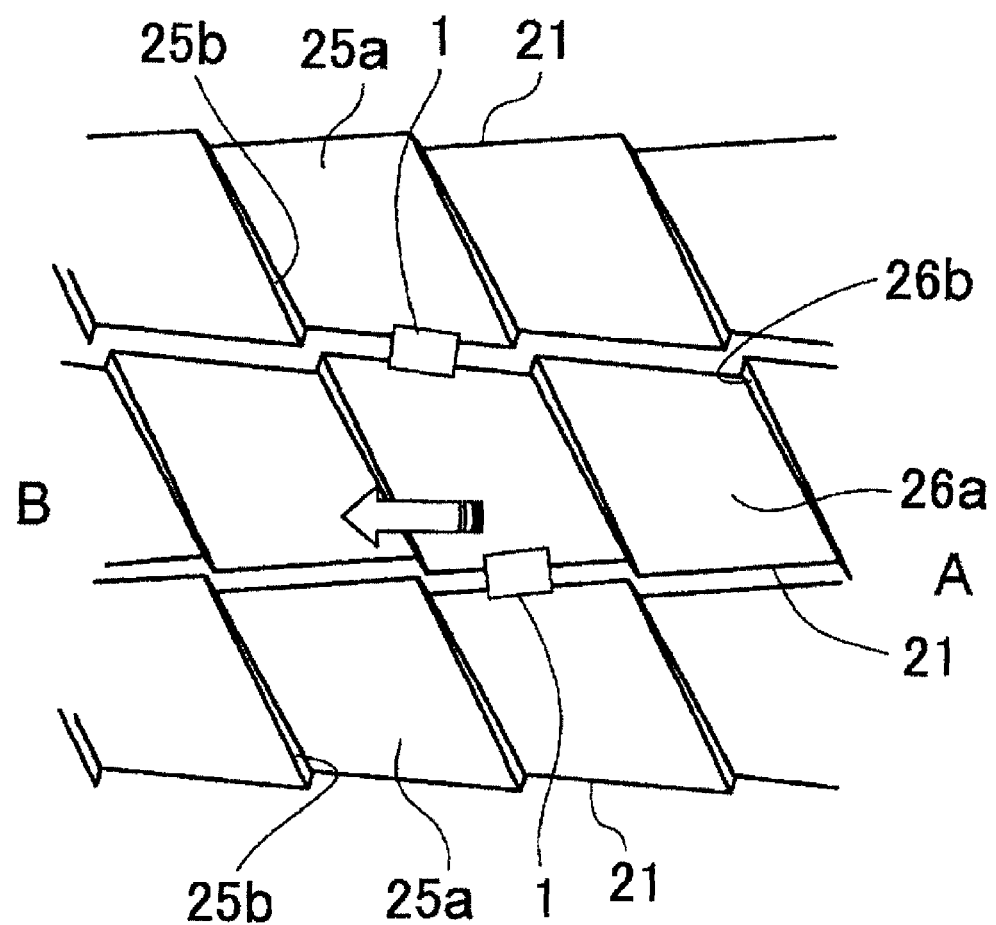

[Fig. 5]
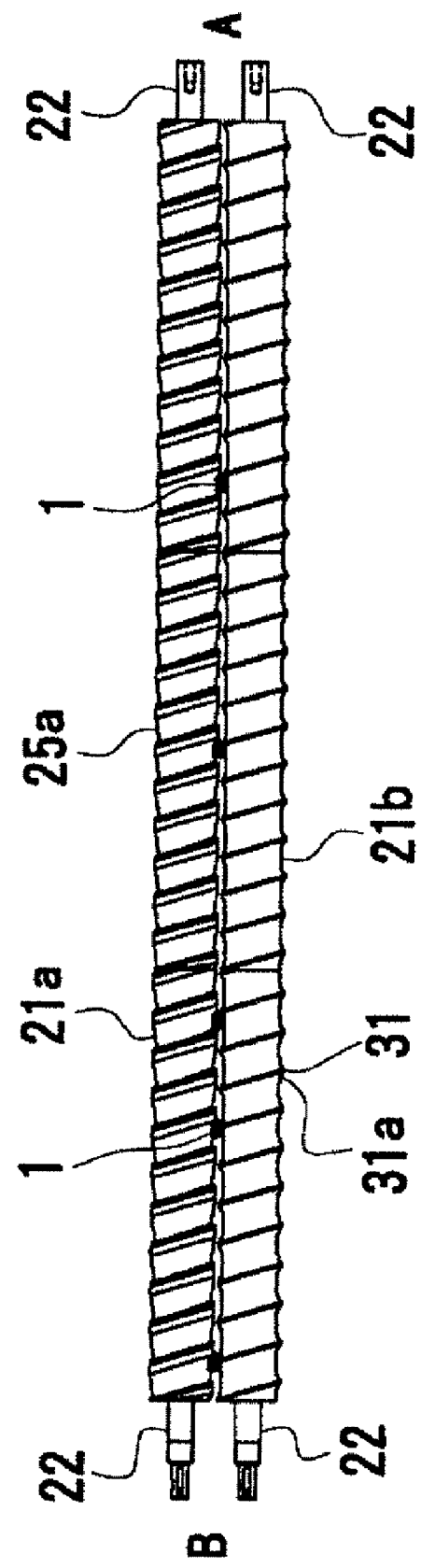

[Fig. 6]
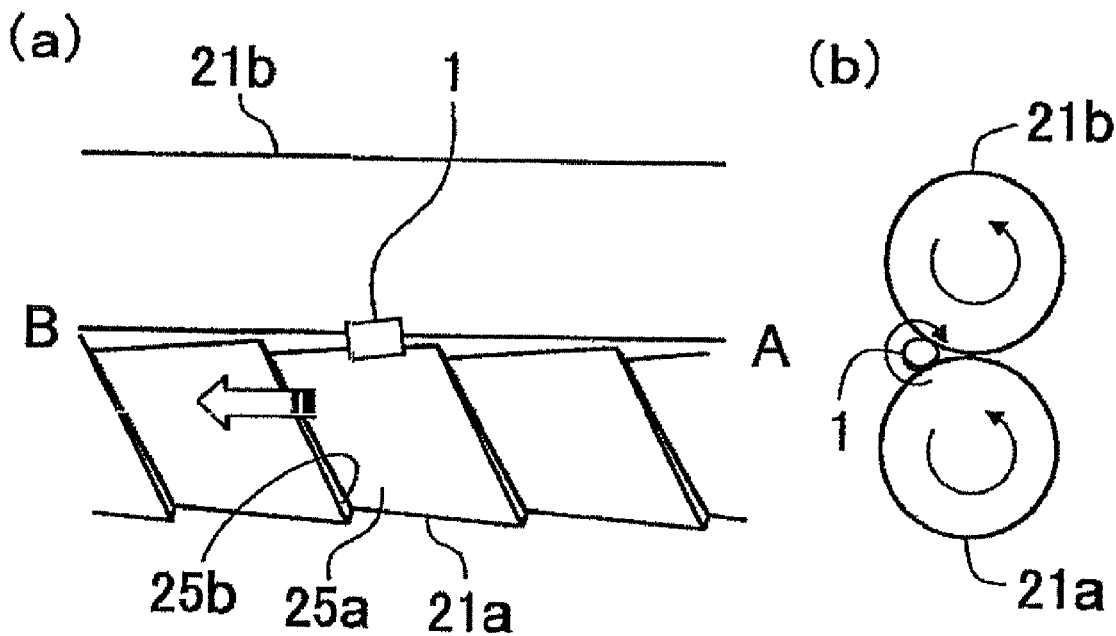
[Fig. 7]
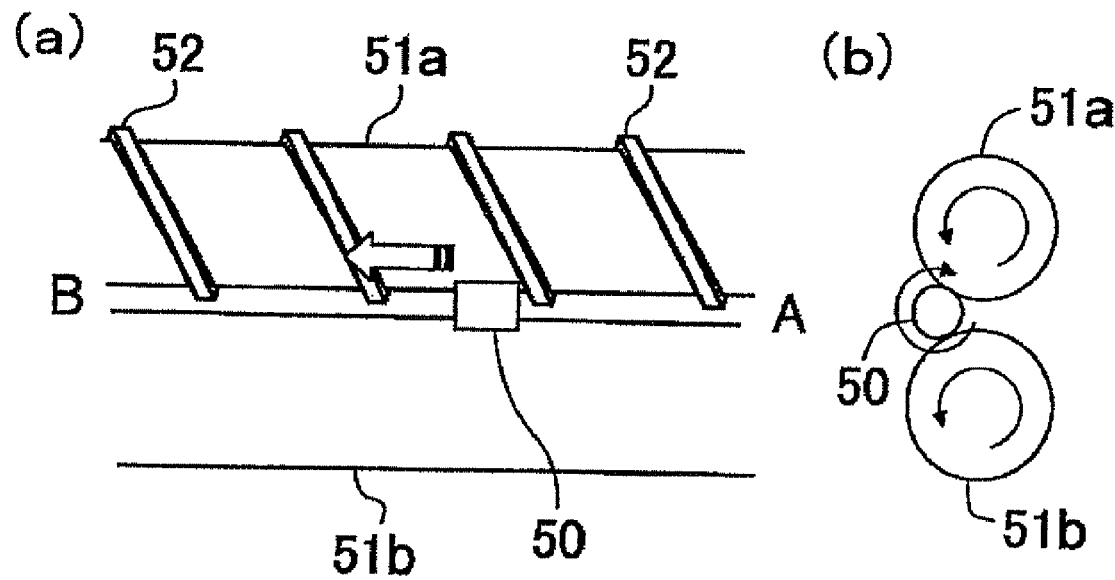
Prior Art          Prior Art

CONVEYING APPARATUS AND CONVEYED OBJECT INSPECTION APPARATUS

TECHNICAL FIELD

The present invention relates to a conveying apparatus which conveys a conveyed object such as a cylindrical work, and to a conveyed object inspection apparatus.

BACKGROUND ART

There are varieties of methods of conveying a conveyed object such as a work, including a method of conveying the work while carrying it on a belt conveyer, a method of conveying the work while transferring the work using an index table or a robot arm equipped with a suction nozzle to fix the work by vacuum suction, and a method of conveying the work by a combination of conveyance mechanisms of the index table and the robot arm.

Conventional belt conveyer system has a problem of being incapable of conveying the work in a stable seating mode for the case of conveying a cylindrical work having a large length relative to its diameter and having a small diameter because that kind of work is unstable on the belt conveyer. When image inspecting the work at the entire outer periphery thereof, if the seating pitches of the works on the belt conveyer are small, the image processing is difficult because other works enter the visual field of the imaging camera and because accurate image inspection cannot be given under an influence of reflection of lighting on other works. Consequently, the works are requested to be seated while securing a relatively wide distance therebetween. Responding to the situation, increasing the processing speed of the image inspection requires increasing the belt speed, which raises a problem that cylindrical works which have a large length relative to the diameter and which have a high center of gravity cannot be seated stably. In particular, it has been impossible to convey such works with a small diameter.

Regarding the conventional conveying methods using the index table or the robot arm, the suction nozzle is required to be selected to agree with the shape and size of the works. Accordingly, switching the works at the change of products needs to stop the operation of the apparatus for the replacement of the suction nozzle, which raises a problem of deteriorated operation efficiency. In addition, there is a problem of increase in the apparatus cost because of the large number of parts and their complexity. Furthermore, since the suction nozzle hides a portion of the work, there is required a step of re-catching the work at a different place, which further increases the number of parts of the apparatus and increases the cost of apparatus.

For the index-table method, increasing the processing speed of the image inspection requires that the suction speed of the suction nozzle and the operating speed of the index table itself are increased. However, there are problems that a sufficient suction time should be secured using a differential vacuum gauge to ensure a correct operation of vacuum suction responding to the material of and surface treatment state of the work, and that a limitation exists in increasing the operating speed because the diameter of the index table increases owing to the installation of the imaging camera and thereby the moment of inertia during the rotation of the index table is limited. Furthermore, there is a problem that, when the suction nozzle is equipped with a mechanism to rotate the work, the weight-increase deteriorates the moment of inertia, which increases the operating time. If a mechanism is adopted wherein the suction nozzle is rotated by a separate driving source after the index table is rotated, an operating time is added. For the conveying method using the robot arm, the time for returning the robot arm is required so that there is a structural problem that increasing the operating speed is limited.

To solve these problems, there has been proposed a roller-conveying apparatus which is illustrated in FIGS. 7(a) and (b), (refer to, for example, Patent Document 1), in which a spiral lead 52 is fanned in a convex shape at a constant pitch on the outer periphery surface of a roller 51a which is one of two rollers 51a and 51b arranged in parallel with each other, and each of the rollers 51a and 51b is rotated to convey a conveyed object 50 such as a work which is held between the rollers 51a and 51b. According to the roller-conveying apparatus, increasing the rotational speed of each of the rollers 51a and 51b easily increases the processing speed of image inspection in a state that the conveyed object 50 is held between the rollers 51a and 51b.
[Patent Document 1] Japanese Patent Application Laid-Open No. H10-221311

The roller-conveying apparatus described in Patent Document 1, however, conveys the conveyed object by the action of contact with the convex lead of the roller, and the contact results in stopping of the rotation of the conveyed object or lifting up of the conveyed object to generate a phenomenon wherein the conveyed object is vibrated. Consequently, accurate image inspection cannot be performed. In addition, there is a problem that the contact between the conveyed object and the convex lead scrapes the surface of the conveyed object to generate scraped debris.

The present invention was perfected to solve the above problems. An object of the present invention is to provide a conveying apparatus and a conveyed object inspection apparatus capable of performing accurate image inspection and preventing the generation of scraped debris of the conveyed object.

SUMMARY OF THE INVENTION

To achieve the above object, a conveying apparatus according to the present invention conveys a conveyed object, held between two conveying rollers with central axes thereof being arranged in parallel, from one end side of each of the conveying rollers to the other end side thereof by rotating the conveying rollers in the same direction, wherein one of the two conveying rollers has a conveying surface provided in a spiral manner on an outer periphery surface thereof, and the conveying surface is slanted with respect to the central axis narrowing toward the other end side so as to convey the conveyed object while holding it between the conveying surface and the other conveying roller.

The conveying apparatus according to the present invention is used to convey a conveyed object that is mainly a cylindrical work or the like. Since the conveying apparatus of the present invention has a structure that one of the conveying rollers has the conveying surface provided on the outer periphery surface thereof and slanted with respect to the central axis narrowing toward the other end side, the conveyed object can be held between the conveying surface and the other conveying roller in a state that the conveyed object contacts with the conveying surface along the inclination of the conveying surface. As a result, by rotating each conveying roller in the reverse direction to the direction of the spiral extending from one end to the other end of the conveying surface, the conveyed object along the inclination of the conveying surface is conveyed along the direction of spiral on the conveying surface from the one end side to the other end side.

Consequently, when the conveyed object is a cylindrical work, the conveyed object can be conveyed under smooth rotation with the rotation of each conveying roller, without vibration of the conveyed object. The smooth rotation of the conveyed object allows for accurate photographing on the entire outer surface of the conveyed object, and allows for accurate image inspection. The conveyed object is conveyed while rotating in contact with the conveying surface along the inclination of the conveying surface, and the conveyed object is prevented from being scraped by the contact with each conveying roller and is prevented from generating scraped debris of the conveyed object. As a result, in the image inspection, a normal conveyed object can be prevented from being treated as defective due to the attachment of scraped debris thereto.

The conveying apparatus according to the present invention may have three or more conveying rollers arranged such that the central axes thereof are in parallel with each other, and one conveying roller of any two adjacent conveying rollers may have a conveying surface at the outer periphery surface thereof. In that case, the conveyed object can be conveyed while being held between the adjacent two conveying rollers. Adding one conveying roller provides one additional carrying route. Therefore, compared with the case of increasing the number of conveying apparatuses each composed of two conveying rollers, more conveyed objects may be conveyed with a smaller number of conveying rollers, which is more efficient.

According to the conveying apparatus of the present invention, it is preferable that the above-described other conveying roller has a spiral projection on the outer periphery surface thereof, that the projection forms a curved surface at the outer surface on the other end side in a manner such that the angle between the outer surface on the other end side and the central axis becomes gradually small from the top to the bottom of the curved surface. In that case, the conveyed object is conveyed while rotating in a state that the conveyed object contacts with the conveying surface along the inclination of the conveying surface of the one conveying roller, and that the rear end of the conveyed object contacts with the outer surface on the other end side of the projection of the other conveying roller. As a result, the conveyed object can be conveyed while being held in a further stable state. Because the outer surface of the projection on the other end side forms a curved surface in a manner such that the angle between the outer surface of the projection on the other end side and the central axis becomes gradually small from the top to the bottom of the curved surface, the conveyed object can be conveyed without vibrating and the conveyed object can be prevented from being scraped by the contact with the projection.

According to the conveying apparatus of the present invention, the above-described other conveying roller may have a tilt surface provided in a spiral manner on the outer periphery surface, and the tilt surface may be slanted with respect to the central axis narrowing toward the one end side. In that case, the conveyed object is conveyed while rotating in a state that the conveyed object contacts with the conveying surface along the inclination of the conveying surface of the one conveying roller, and that the conveyed object contacts with the tilt surface along the inclination of the tilt surface of the other conveying roller. As a result, the conveyed object can be conveyed while being held in a further stable state.

According to the conveying apparatus of the present invention, each conveying roller is preferably movable along the central axis direction. In that case, the positional relation in the central axis direction can be adjusted between the conveying surface of the one conveying roller and the projection or the tilt surface of the other conveying roller. As a result, the conveyed object can be supported stably on the conveying surface and the projection or the tilt surface by moving each conveying roller along the central axis direction responding to the length of the conveyed object.

According to the conveying apparatus of the present invention, the conveying rollers are preferably adjustable in distance therebetween. In that case, the conveyed object can be stably held between the conveying rollers by varying the gap between the conveying rollers depending on the width, thickness, diameter, and the like of the conveyed object.

A conveyed object inspection apparatus according to the present invention includes the conveying apparatus according to the present invention and an inspection section, wherein the inspection section includes an image acquisition means capable of acquiring an image of the entire outer surface of the conveyed object being conveyed while being held between the conveying rollers, and an abnormality detecting means detecting abnormality of the conveyed object based on the image acquired by the image acquisition means.

Because of the conveying apparatus of the present invention, the conveyed object inspection apparatus of the present invention can convey the conveyed object while smoothly rotating it with the rotation of each conveying roller. Therefore, compared with the case that the conveyed object does not rotate, the number of image acquisition means, such as imaging cameras, to acquire images of the entire outer surface of the conveyed object can be decreased. Consequently, the apparatus cost can be decreased. In addition, since the conveyed object can be smoothly rotated, the entire outer surface of the conveyed object can be accurately photographed, and accurate image inspection can be executed.

According to the conveyed object inspection apparatus of the present invention, abnormality of the conveyed object which is detected by the abnormality detecting means may be any type as long as the abnormality is observed on the conveyed object, including flaws and deformation thereon, not limited to dust and foreign matters attached to the conveyed object. Furthermore, the image acquired by the image acquisition means may be either a still image or a moving image.

It is preferable that the conveyed object inspection apparatus according to the present invention has a feeding means and a removing means, wherein the feeding means is positioned on the one end side and is capable of feeding the conveyed object inbetween the conveying rollers; the image acquisition means is positioned at a position more on the other end side than the position where the feeding means feeds the conveyed object so as to be capable of acquiring an image of the conveyed object; the abnormality detecting means is capable of transmitting a detection signal when detecting abnormality of the conveyed object; the removing means is positioned at a position more on the other end side than the position of the image acquisition means, receives the detection signal transmitted from the abnormality detecting means, and is capable of removing the conveyed object on which the abnormality is detected by the abnormality detecting means from between the conveying rollers; and each conveying roller has a collection section with a small diameter at a position more on the other end side than the position of the removing means. In that case, since the conveyed object on which abnormality is detected can be removed from between the conveying rollers by the removing means, the conveyed object on which abnormality is not detected can be separated from the conveyed object on which abnormality is detected. Since the collection section on the other end side of each conveying roller has a small diameter, the conveyed object which is conveyed without being removed by the removing means can be dropped down from the gap between the conveying rollers at the collection section. Therefore, by placing a container or the like below the collection section, the conveyed objects on which no abnormality is detected can be collected.

The present invention can provide a conveying apparatus and a conveyed object inspection apparatus which can perform correct image inspection and prevent generation of scraped debris of conveyed objects.

BRIEF DESCRIPTION OF THE DRAWINGS

FIG. 1 shows a perspective view of a conveyed object inspection apparatus according to an embodiment of the present invention;

FIG. 2 is a set of an enlarged plan view (a) and a cross sectional view (b) that show conveying rollers of a conveying apparatus of the conveyed object inspection apparatus given in FIG. 1;

FIG. 3 shows conveying rollers of the conveying apparatus of the conveyed object inspection apparatus given in FIG. 1. FIG. 3(a) is a cross sectional view wherein the distance between the central axes is narrowed, and FIG. 3(b) is a cross sectional view wherein the distance between the central axes is widened;

FIG. 4 shows an enlarged plan view of a modification of the conveyed object inspection apparatus of FIG. 1 wherein the number of conveying rollers is increased;

FIG. 5 shows a plan view of a first variation of the conveying rollers of the conveyed object inspection apparatus given in FIG. 1;

FIG. 6 shows an enlarged plan view of a second variation of the conveying rollers of the conveyed object inspection apparatus given in FIG. 1; and FIG. 7 is a set of an enlarged plan view (a) and a cross sectional view (b) that show conveying rollers of a roller conveying apparatus of a conventional conveyed object inspection apparatus.

BEST MODE FOR CARRYING OUT THE INVENTION

Embodiments of the present invention will be described below referring to the drawings.

FIGS. 1 to 6 show a conveyed object inspection apparatus and a conveying apparatus according to embodiments of the present invention.

As shown in FIG. 1, a conveyed object inspection apparatus 10 has a conveying apparatus 11, a feeding means 12, an inspection section 13, and a removing means 14.

As illustrated in FIG. 1, the conveying apparatus 11 has a support table (not shown), two conveying rollers 21a and 21b, and a rotating means (not shown). The support table has a pair of end side walls arranged in parallel with each other. The end side walls have two pairs of bearing holes that are opposed to each other and arranged in lateral direction at a predetermined spacing. Each bearing hole has a laterally elongated shape.

Each of the conveying rollers 21a and 21b has a rotary shaft 22 and a roller section 23. Each end of the rotary shaft 22 is inserted in each bearing hole of each end side wall of the support table in rotatably supported style. The roller section 23 is in an elongated cylindrical shape, and the rotary shaft 22 is inserted therein through the center of the roller section and thus the roller section is rotatable about the rotary shaft 22. The roller section 23 is positioned close to the end side wall on the one end A side between the end side walls of the support table. The conveying rollers 21a and 21b are arranged such that the central axes are parallel with each other. With the structure, the conveyed object 1 is held between the roller sections 23 of the conveying rollers 21a and 21b, and is conveyed from the one end A side to the other end B side. Each of the conveying rollers 21a and 21b exposes the rotary shaft 22 between the end side wall on the other end B side and the end of the roller section 23 on the other end B side, thereby forming a collection section 24 having a smaller diameter than that of the roller section 23.

As illustrated in FIG. 2, the conveying roller 21a has a conveying surface 25a which is formed in a spiral manner on the outer periphery surface of the roller section 23 from the one end A side to the other end B side. The conveying surface 25a is slanted with respect to the central axis of the conveying roller 21a narrowing toward the other end B side. Since the conveying surface 25a tilts, a step 25b is formed at the boundary between the conveying surface 25a at a certain position and the conveying surface 25a after one turn starting from the certain position around the outer periphery surface of the roller section 23. The other conveying roller 21b has a tilt surface 26a which is formed in a spiral manner on the outer periphery surface of the roller section 23 from the one end A side to the other end B side. The tilt surface 26a is slanted with respect to the central axis of the conveying roller 21b narrowing toward the one end A side. Since the tilt surface 26a tilts, a step 26b is formed at the boundary between the tilt surface 26a at a certain position and the tilt surface 26a after one turn starting from the certain position around the outer periphery surface of the roller section 23. As described above, the conveying rollers 21a and 21b are configured such that the roller sections 23 are opposed in the direction of the rotary shafts 22. According to a specific embodiment, the angle between the conveying surface 25a and the central axis direction, and the angle between the tilt surface 26a and the central axis direction are equal to each other and are less than 10°.

Each of the conveying rollers 21a and 21b can move along the central axis direction, and the mounting positions of the rotary shafts 22 to the respective bearing holes can be varied. As illustrated in FIG. 3, the conveying rollers 21a and 21b can vary the gap therebetween by varying the mounting positions of the respective rotary shafts 22 along the laterally elongated bearing holes.

The rotating means has a rotary motor and a drive belt, and is mounted on the outer surface of the end side wall on the one end A side of the support table. The rotating means connects the rotary shaft of the rotary motor with an end of the rotary shaft 22 of each of the conveying rollers 21a and 21b through the drive belt, and rotates the rotary motor to allow both the conveying rollers 21a and 21b to rotate in the same direction.

As illustrated in FIG. 1, the feeding means 12 is structured by an elongated plate-shaped linear feeder, and is located on the one end A side of the conveying rollers 21a and 21b. The feeding means 12 has an end section 12a that tilts toward the one end A side of the roller section 23 of each of the conveying rollers 21a and 21b. The feeding means 12 is constituted such that the conveyed object 1 is allowed to slide on the upper face of the feeding means by vibrations and is fed inbetween the roller sections 23 of the conveying rollers 21a and 21b synchronously with the rotation of the conveying rollers 21a and 21b. The feeding means 12 has a pair of guide walls (not shown) along both sides thereof.

The inspection section 13 has an optical sensor (not shown) an image acquisition means 27, and an abnormality detecting means (not shown). The optical sensor is mounted at a position more on the other end B side than the position where the feeding means 12 feeds the conveyed object 1 so that it can detect the conveyed object 1 that is being held and conveyed between the conveying rollers 21a and 21b. Once the optical sensor detects the conveyed object 1, the optical sensor transmits a passing signal. The image acquisition means 27 is composed of a certain number of imaging cameras capable of successively taking digital images, and is located above the conveying rollers 21a and 21b. According to the embodiment illustrated in FIG. 1, two units of imaging cameras are arranged. Regarding the image acquisition means 27, one imaging camera is directed downward tilting toward the one end A side and the other imaging camera is directed downward tilting toward the other end B side at a position more on the other end B side than the position of the optical sensor so that the cameras can photograph both the side and the front and rear ends of the conveyed object 1 being held and conveyed inbetween the conveying rollers 21a and 21b. The image acquisition means 27 receives the passing signal coming from the optical sensor and acquires images of the entire outer surface of the conveyed object 1. The image acquisition means 27 may be controllable in terms of position, facing direction, focal position and the like of each imaging camera.

The abnormality detecting means is composed of a computer, and is connected to the image acquisition means 27. The abnormality detecting means receives an image taken by the image acquisition means 27, conducts image processing, and automatically detects abnormality such as dust and foreign matters attached to the conveyed object 1, or flaws, deformation and the like on the conveyed object 1. Upon detecting abnormality of the conveyed object 1, the abnormality detecting means transmits a detection signal.

As illustrated in FIG. 1, the removing means 14 is positioned between the image acquisition means 27 and the collection section 24, and has an air nozzle 28, a suction nozzle 29, a control section (not shown) and a guide hose (not shown). The air nozzle 28 is placed below the conveying rollers 21a and 21b, and can eject high pressure air toward the space between the conveying rollers 21a and 21b. The suction nozzle 29 is located above the conveying rollers 21a and 21b, and right above the air nozzle 28, and is capable of vacuum suctioning air and articles. The control section receives the detection signal transmitted from the abnormality detecting means, and controls the air nozzle 28 and the suction nozzle 29. The guide hose is connected to the suction nozzle 29, and discharges the air suctioned by the suction nozzle 29 and collects the articles suctioned by the suction nozzle 29. Upon the receiving of the detection signal at the control section, the removing means 14 actuates the air nozzle 28 and the suction nozzle 29, and removes the conveyed object 1 on which the abnormality detecting means detects abnormality by ejecting air from the air nozzle 28 upward to lift the defective conveyed object from between the conveying rollers 21a and 21b and thereby to suction and collect the conveyed object 1 by the suction nozzle 29.

The working of the present invention will be described below.

In the conveyed object inspection apparatus 10, the conveying apparatus 11 is used to convey the conveyed object 1 that may be a cylindrical work. Regarding the conveying apparatus 11, the conveying surface 25a formed on the outer periphery surface of the conveying roller 21a is slanted with respect to the central axis narrowing toward the other end B side, while the tilt surface 26a formed on the outer periphery surface of the other conveying roller 21b is slanted with respect to the central axis narrowing toward the one end A side. Accordingly, the conveyed object 1 can be held between the conveying surface 25a and the tilt surface 26a in a state that the conveyed object 1 is in contact with the conveying surface 25a and the tilt surface 26a along the inclination of the conveying surface 25a and the tilt surface 26a. As a result, by rotating each of the conveying rollers 21a and 21b in the direction opposite to the travelling direction of the spiral travelling from the one end A side to the other end B side of the conveying surface 25a, the conveyed object 1 along the inclination of the conveying surface 25a and the tilt surface 26a can be conveyed from the one end A side to the other end B side along the spiral direction of the conveying surface 25a and the tilt surface 26a. Furthermore, the structure permits conveying the conveying object 1 without applying external pressure thereto.

Since the conveyed object 1 is a cylindrical work, the conveyed object 1 can be conveyed while smoothly rotating with the rotation of the conveying rollers 21a and 21b without vibrating. Since the conveyed object 1 is conveyed while rotating in contact with the conveying surface 25a and the tilt surface 26a along the inclination of the conveying surface 25a and the tilt surface 26a, the conveyed object 1 is prevented from being scraped by the contact with the conveying rollers 21a and 21b, and does not generate scraped debris.

The conveyed object inspection apparatus 10 can convey the conveyed object 1 while the conveyed object is smoothly rotated by the conveying apparatus 11 with the rotation of the conveying rollers 21a and 21b. Consequently, compared with the case that the conveyed object 1 does not rotate, the number of the image acquisition means 27 such as imaging cameras to acquire images of the entire outer surface of the conveyed object 1 can be decreased. As a result, the apparatus cost can be decreased. In addition, since the conveyed object 1 can be smoothly rotated, the entire outer surface of the conveyed object 1 can be accurately photographed, and accurate image inspection can be performed. Since the generation of scraped debris of the conveyed object 1 is prevented, a normal conveyed object 1 is not treated as defective due to scraped debris attached thereto in the image inspection.

To stably rotate a conveyed object 1 that is a cylindrical work, the diameter of each of the conveying rollers 21a and 21b is preferably about 30 mm when the diameter of the conveyed object 1 is about 5 to about 10 mm. If the diameter of the conveyed object 1 is larger than above, it is preferable to adopt the conveying rollers 21a and 21b having an adequate diameter corresponding to the diameter of the conveyed object.

Since the conveyed object inspection apparatus 10 can remove the conveyed object 1 on which abnormality is detected from between the conveying rollers 21a and 21b by means of the removing means 14, the conveyed object 1 on which abnormality is detected can be separated from the conveyed object 1 on which no abnormality is detected. Since the collection section 24 on the other end B side of each of the conveying rollers 21a and 21b is small in diameter, the conveyed object 1 which is conveyed without being removed by the removing means 14 can be dropped downward from between the conveying rollers 21a and 21b at the collection section 24. Consequently, by placing a container or the like under the collection section 24, the conveyed objects 1 on which no abnormality is detected can be collected.

Since the conveying apparatus 11 is structured such that each of the conveying rollers 21a and 21b is movable along the central axis direction, the positional relation between the conveying surface 25a of the conveying roller 21a and the tilt surface 26a of the other conveying roller 21b can be adjusted along the central axis direction. Consequently, the conveying rollers 21a and 21b may be moved along the central axis direction responding to the length of the conveyed object 1 to hold stably the conveyed object 1 between the conveying surface 25a and the tilt surface 26a. Furthermore, as illustrated in FIG. 3, the conveying apparatus 11 can vary the distance between the central axes of the conveying rollers 21a and 21b. The gap between the conveying rollers 21a and 21b may be varied depending on the width, thickness, diameter or the like of the conveyed object 1 to hold stably the conveyed object 1 between the conveying rollers 21a and 21b. In addition, the level of the conveyed object 1 from each of the conveying rollers 21a and 21b is adjustable by varying the distance between the central axes. Therefore, even when the conveyed object 1 is off the focal depth of each imaging camera of the image acquisition means 27, the level of the conveyed object 1 can be adjusted to acquire focused images.

As described above, the conveyed object inspection apparatus 10 can execute the image inspection of the conveyed object 1 with a simple and inexpensive structure.

As illustrated in FIG. 4, the conveyed object inspection apparatus 10 may have three or more conveying rollers 21 arranged such that the central axes thereof are in parallel with each other, and one of any two adjacent conveying rollers 21 may have a conveying surface 25a on the outer periphery surface of the roller section 23, while the other conveying roller 21 may have a tilt surface 26a on the outer periphery surface of the roller section 23. In this case, the conveyed object 1 can be conveyed while being held between the two adjacent conveying rollers 21. Adding one conveying roller 21 provides one additional carrying route. Therefore, compared with the case of increasing the number of conveying apparatuses each composed of two conveying rollers 21, more conveyed objects 1 may be conveyed with a smaller number of conveying rollers 21, which is more efficient.

As illustrated in FIG. 5, in the conveyed object inspection apparatus 10, the conveying roller 21b of the conveying rollers 21a and 21b may have a spiral projection 31 on the outer periphery surface of the roller section 23, and the projection 31 may form a curved surface wherein the angle between the outer surface 31a on the other end B side and the central axis direction becomes gradually small from the top to the bottom of the curved surface. In the above case wherein the outer surface 31a on the other end B side forms a curved surface, the conveyed object 1 is conveyed while rotating in a state that the conveyed object 1 contacts with the conveying surface 25a along the inclination of the conveying surface 25a of the conveying roller 21a, and that the rear end of the conveyed object 1 contacts with the outer surface 31a on the other end B side of the projection 31 of the other conveying roller 21b. As a result, the conveyed object 1 can be conveyed while being held in a stable state. Furthermore, since the outer surface 31a on the other end B side forms a curved surface such that the angle between the outer surface 31a on the other end B side of the projection 31 and the central axis direction becomes gradually small from the top to the bottom of the curved surface, the conveyed object 1 can be conveyed without vibrating, and the scraping of the conveyed object 1 by the contact with the projection 31 can be prevented.

As illustrated in FIG. 6, in the conveyed object inspection apparatus 10, the conveying roller 21b of the conveying rollers 21a and 21b may have no tilt surface 26a or no projection 31 on the outer periphery surface of the roller section 23, and the roller section 23 may be in a cylindrical shape. In this case, since the conveyed object 1 can be held in contact with the conveying surface 25a along the inclination of the conveying surface 25a, the conveyed object 1 can be conveyed while smoothly rotating with the rotation of the conveying rollers 21a and 21b without vibration of the conveyed object 1, and the conveyed object 1 is prevented from generating scraped debris. Since the conveying roller 21b has no tilt surface 26a or no projection 31 on the outer periphery surface of the roller section 23, the working cost can be decreased compared with the case where the tilt surface 26a or the projection 31 is provided. If the conveyed object 1 is light in weight, or the conveyed object 1 is made of a material giving small friction resistance, it is preferable that the angle between the conveying surface 25a of the conveying roller 21a and the central axis direction is 10° or more. Furthermore, each of the conveying rollers 21a and 21b may be inclined in the lengthwise direction so that the conveyed object 1 will follow the inclination of the conveying surface 25a by the self weight of the conveyed object 1.

The cylindrical works to which the present invention is applied are not particularly limited, and preferable examples thereof include syringe pistons.

The invention claimed is:

1. A conveying apparatus for conveying a conveyed object, the conveying apparatus comprising:
a first conveying roller and a second conveying roller with central axes thereof being arranged in parallel, wherein the conveyed object is conveyed from one end side of each of the conveying rollers to other end side thereof by rotating the conveying rollers in the same direction, and wherein:
the first conveying roller has a conveying surface provided in a spiral manner on an outer periphery surface thereof, and the conveying surface is slanted with respect to the central axis narrowing toward the other end side, and
the second conveying roller has a tilt surface provided in a spiral manner on an outer periphery surface thereof, and the tilt surface is slanted with respect to the central axis narrowing toward one side so as to convey the conveyed object on the respective roller surfaces while rotating the conveyed object on the first conveying roller and the second conveying roller.

2. A conveying apparatus for conveying a conveyed object, the conveying apparatus comprising:
a first conveying roller and a second conveying roller having central axes arranged in parallel, wherein the conveyed object is conveyed from one end side of each of the conveying rollers to the other end side thereof by rotating the conveying rollers in the same direction, and wherein
the first conveying roller has a conveying surface provided in a spiral manner on an outer periphery surface thereof, and the conveying surface is slanted with respect to the central axis narrowing toward the other end side, and
the second conveying roller has a spiral projection on an outer periphery surface thereof, and the projection forms a curved outer surface on the other end side in a manner such that the angle between the outer surface on the other end side and the central axis direction becomes gradually small from the top to the bottom of the projection, so as to convey the conveyed object on the respective surfaces of the rollers while rotating the object on roller surfaces.

3. The conveying apparatus according to claim 1, wherein each conveying roller is movable along the central axis direction.

4. The conveying apparatus according to claim 1, wherein the conveying rollers are adjustable in distance therebetween.

5. The conveying apparatus according to claim 2, wherein each conveying roller is movable along the central axis direction.

6. The conveying apparatus according to claim 2, wherein the conveying rollers are adjustable in distance therebetween.

* * * * *

UNITED STATES PATENT AND TRADEMARK OFFICE
CERTIFICATE OF CORRECTION

| | | |
|---|---|---|
| PATENT NO. | : 7,971,703 B2 | Page 1 of 1 |
| APPLICATION NO. | : 12/302393 | |
| DATED | : July 5, 2011 | |
| INVENTOR(S) | : Takemitu Sato | |

It is certified that error appears in the above-identified patent and that said Letters Patent is hereby corrected as shown below:

Title page, item [57], Column 2, Abstract, Line 17, "imageA" should read -- image. A --

Signed and Sealed this
Eighteenth Day of October, 2011

David J. Kappos
*Director of the United States Patent and Trademark Office*